Figure 1A:
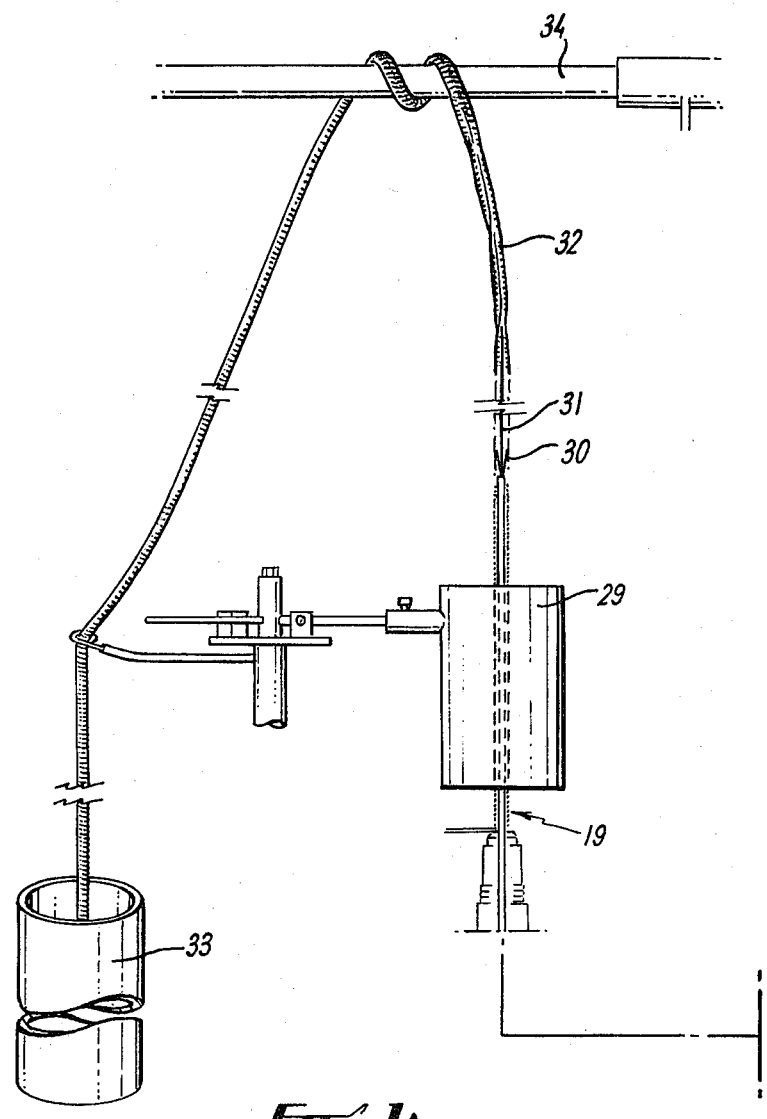

United States Patent [19]

Leuvelink

[11] 4,388,264
[45] Jun. 14, 1983

[54] METHOD AND MEANS FOR WINDING HELICAL COILS FROM THERMOPLASTIC MATERIALS

[75] Inventor: Gerrit W. E. Leuvelink, Haaksbergen, Netherlands

[73] Assignee: Textieltechniek Haaksbergen B.V., Haaksbergen, Netherlands

[21] Appl. No.: 305,704

[22] Filed: Sep. 25, 1981

[30] Foreign Application Priority Data

Sep. 26, 1980 [GB] United Kingdom ............... 8031199

[51] Int. Cl.³ ............................................. B29C 17/02
[52] U.S. Cl. ........................... 264/281; 264/DIG. 40; 425/334; 425/391; 425/DIG. 7
[58] Field of Search ............... 264/281, DIG. 40, 339; 425/391, 334, 319, DIG. 7

[56] References Cited

U.S. PATENT DOCUMENTS

| | | | |
|---|---|---|---|
| 2,173,096 | 9/1939 | Campbell | 264/281 |
| 2,575,747 | 11/1951 | Cook | 264/281 |
| 2,740,987 | 4/1956 | Monerieff | 264/281 |
| 2,973,554 | 3/1961 | Hansen | 425/391 |
| 3,057,015 | 10/1962 | Nichols et al. | 264/281 |
| 3,071,917 | 1/1963 | Fisher | 425/391 |
| 3,087,199 | 4/1963 | Franke, Jr. et al. | 264/281 |
| 3,308,856 | 3/1967 | Ploss | 140/17 |
| 4,172,874 | 10/1979 | Castro, Jr. | 264/281 |
| 4,285,899 | 8/1981 | Pavy et al. | 264/281 |

*Primary Examiner*—James B. Lowe
*Attorney, Agent, or Firm*—Fleit, Jacobson & Cohn

[57] ABSTRACT

A method of and means of winding close wound helical coils of a thermoplastic monofilament material is proposed wherein, in order to avoid secondary twist in the resultant coil, the coil, after having been wound and heat set under controlled conditions on a first part of a mandrel, is twisted in a direction tending to close the individual turns of the coil during the cooling thereof while passing along and/or from the end of a second part of the mandrel to a twist arresting means arranged in spaced apart disposition relative to such end.

17 Claims, 3 Drawing Figures

METHOD AND MEANS FOR WINDING HELICAL COILS FROM THERMOPLASTIC MATERIALS

This invention relates to the manufacture of link belts of the kind comprising a multiplicity of helical coils of a polymeric material arranged in adjacent interdigitated disposition. In particular the invention relates to a method of and apparatus for the manufacture of the aforementioned helical coils of polymeric material for assembly into a link belt.

It is customary to manufacture such a coil by winding a strap or strand of a thermoplastic material around a mandrel of appropriate cross-sectional shape and dimensions, and to heat the material whilst wrapped around the mandrel to heat-set the strand in the coiled configuration. The coil is then removed from the mandrel overend, the resulting coil then being assembled with other like and alternate oppositely handed coils into a link belt.

A known method of forming such a coil is to wind a strand of thermoplastic material from a bobbin supply thereof onto a rotating mandrel, heat the coil strand whilst on the mandrel and then remove the coil overend from the mandrel.

Another known method is to wind a strand of thermoplastics material from a bobbin supply thereof onto a stationary mandrel by means of a flyer, heat the coiled strand whilst moving it longitudinally of the mandrel and then remove the coil overend from the mandrel. The means for moving the coiled material longitudinally of the mandrel comprises a sleeve surrounding the mandrel and driven so as to reciprocate longitudinally thereof whilst abutting the endmost wrap of the strand material around the mandrel. The movement of the coil longitudinally of the mandrel through the heating zone may be controlled by means of one or more helically ribbed rollers disposed parallel to the mandrel and in contact with the outer surface of the coil. Alternatively, the movement of the coil may be resisted by means of a small local protrusion on the mandrel adjacent the downstream and thereof, and over which the coil must pass before being removed from the mandrel, thus ensuring that each wrap of the strand is pushed against the trailing end of the coil by the reciprocating sleeve.

The coils for use in the manufacture of link belts are of oval or flattened cross-section, and the mandrels used in the aforementioned methods are of appropriate oval or flattened cross-section. However, such coils, when removed from the mandrel after manufacture, may exhibit a degree of secondary twisting, i.e. the major axes of the coil at successive sections along its length are not in a common plane, and in consequence, the coil does not 'lie flat' on a plane surface. This phenomenon, which is thought to be caused by the relaxing of the coil on the mandrel whilst cooling after the heat-setting stage, tends to make assembly of such coils into a link belt difficult and, furthermore, the resulting link belt may be distorted.

The object of the present invention is to provide a method of and apparatus for the manufacture of such a coil which does not have, or has to a reduced extent, the aforementioned secondary twisting.

The invention provides a method of producing a coil for use in the manufacture of a link belt, comprising winding a strand of polymeric material onto a first section of a mandrel of a given cross-section to form a coil, heating the coil so formed whilst moving said coil longitudinally of said first section, passing said heated coil through a zone in which it is cooled and twisted whilst being supported by a second section of said mandrel having a reduced cross-section in comparison with said first section, and removing said coil from said mandrel overend thereof.

The twist insertion may be performed by inserting into an initial length of coil the required level of real twist, before engaging the leading end of the coil with twist arresting means located downstream of the mandrel and forwarding the coil to a collecting means from the twist arresting means. By this means successive lengths of coil are subjected to real twisting as they pass through the zone from the upstream end of the second section of the mandrel to the twist arresting means.

The invention also provides apparatus for use in the production of a coil by the abovementioned method, comprising a mandrel having a first section of a given cross-section and a second section having a reduced cross-section in comparison with said first section, means for winding a strand of polymeric material onto said first section to form a coil, means for moving said coil so formed longitudinally of said mandrel, means for heating said coil in said first section, and means for twisting said coil as it passes along said second section.

Preferably said mandrel is stationary and said strand is wound thereon by means of a flyer. Preferably also a strand supply bobbin is provided and is driven in rotation coaxially with said mandrel.

The second section of the mandrel may taper towards its free end or may comprise a parallel sided bar, for example a round bar.

A twist arresting means may be provided downstream of the mandrel, the said means conveniently comprising a rod around which the coil is passed, making, for example two turns therearound.

A restraint may be provided on the mandrel, adjacent the downstream end of the first section, to inhibit longitudinal movement of the coil therealong, and such restraint may comprise at least one resilient member secured to and extending outwardly of the surface of the mandrel. A pair of such members may be provided on diametrically opposed sides of said mandrel.

A sleeve may be provided on said mandrel and driven so as to reciprocate longitudinally thereof, and to abut the trailing wrap of the coil so as to move the coil longitudinally of the mandrel over the first and second sections and off the end of the mandrel.

Figure 1B:
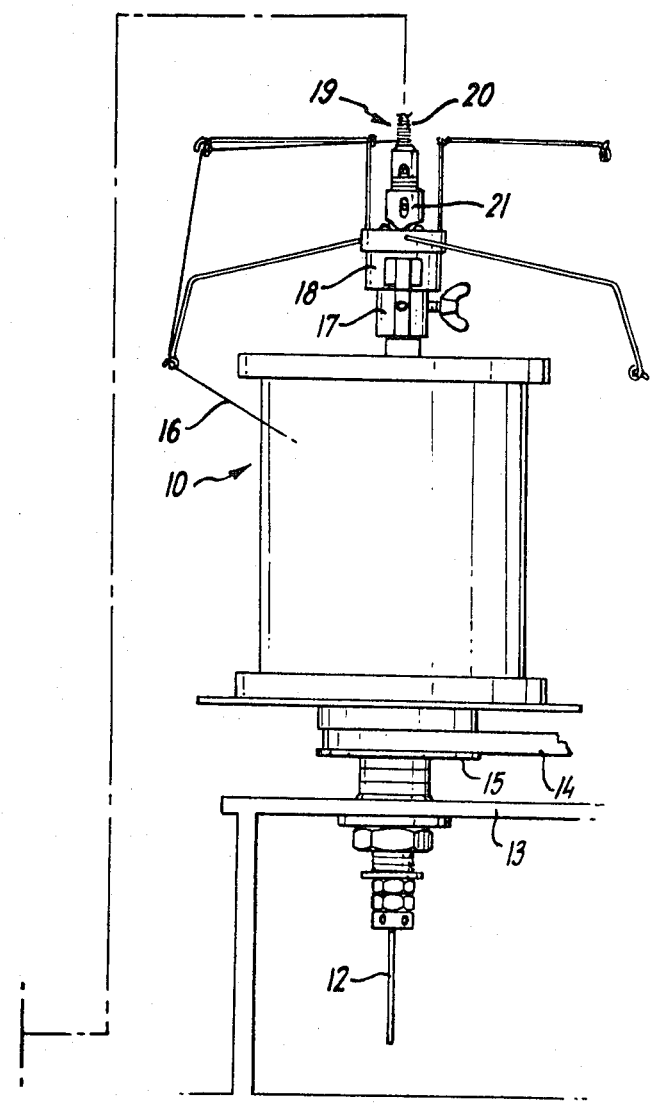
Figure 2:
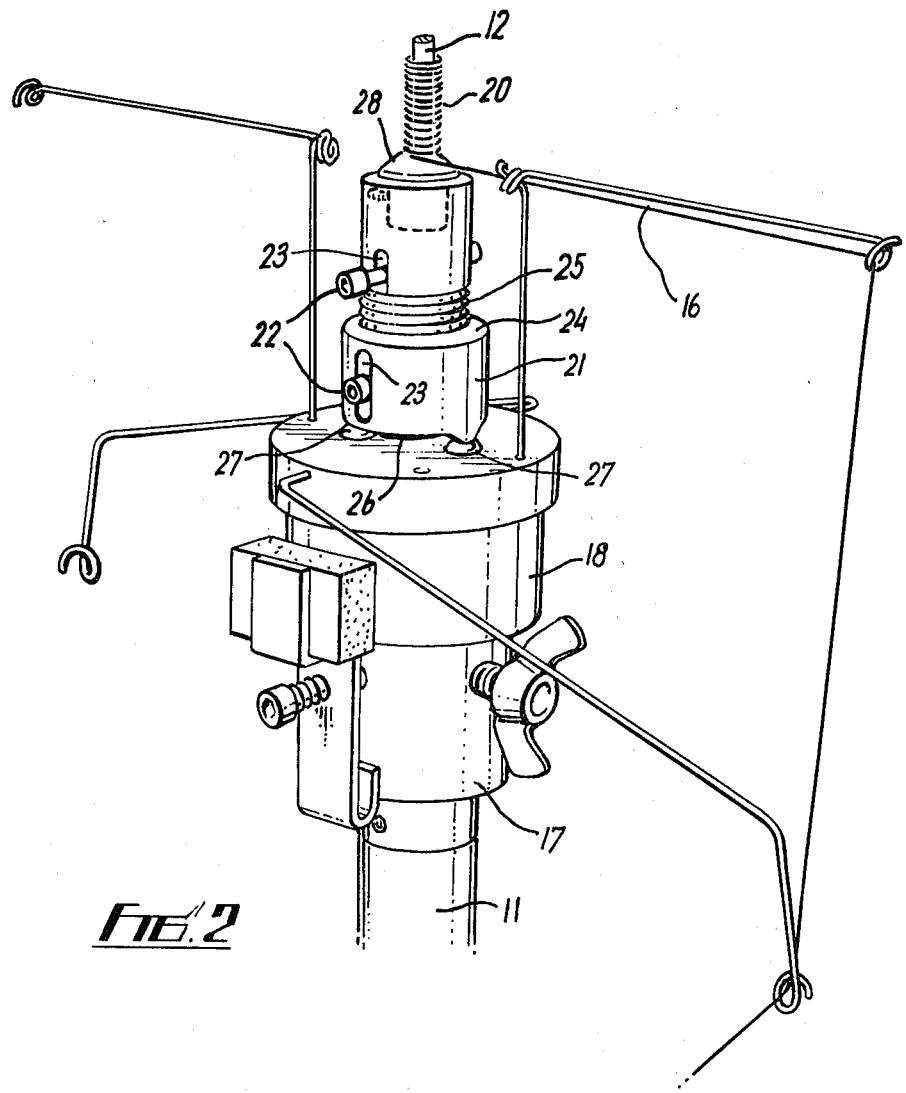

The invention will now be described further, by way of example only, with reference to the accompanying drawings illustrating one embodiment thereof and in which:

FIGS. 1A and 1B collectively show a diagrammatic front elevation of a coil winding apparatus constructed in accordance with the invention; and FIG. 2 shows a part of the arrangement shown in FIG. 1 drawn to a larger scale.

Referring now to the drawing, there is shown a supply bobbin 10 rotatably mounted on a spindle 11 through which passes a fixed mandrel 12 itself mounted on a frame 13. The bobbin spindle 11, and thus the bobbin 10 mounted thereon is rotatably driven by means of a drive belt 14 engaging a pulley 15 secured to or integral with the bobbin spindle 11. On the bobbin 10 is a supply of thermoplastics material in the form of a strand 16. A fixed flyer spindle 17 is provided coaxially with and adjacent the bobbin spindle 11 and carries a flyer head 18 freely rotatable thereon to wrap the strand 16 around the mandrel 12 at a first section 19 thereof on rotation of the bobbin, thus forming a coil 20. A friction pad carried by the flyer spindle bears on the flyer head to exert a light braking effect thereon to tension the strand 16 and smooth out minor variations in the rate of strand feed.

Slidably mounted on the mandrel 12 is a sleeve 21, the movement of the sleeve 21 longitudinally of the mandrel 12 being limited by means of pins 22 secured to the mandrel 12 and extending into axially aligned slots 23 in the sleeve 21. Between the uppermost of the pins 22 and a shoulder 24 of sleeve 21 there is a spring 25 which urges the sleeve downwardly. The lower surface 26 of the sleeve 21 is formed as a cam follower surface and angularly spaced ball cams 27 on the upper surface of the flyer head 18 act as cam elements. Rotation of the flyer head 18 by the flyer spindle 17 through a friction pad drive causes the sleeve 21 to rise and fall under the action of the cam and follower arrangement as defined by surface 26 and the ball cams 27, and the force of spring 25. The upper end 28 of sleeve 21 abuts the coil 20, and in consequence, the vertical movement of the sleeve 21 causes the successive windings of the strand 16 in the coil 20 to be moved progressively upwardly.

The multiple ball cams 27 cause a corresponding number of reciprocations of the sleeve for each revolution of the flyer head, thus to ensure that the successive turns of the coil be closely together and the resultant coil has a constant helix angle.

Above the sleeve 21 and surrounding the first section 19 of mandrel 12 is a heater 29 having an electrical heating element therein. The coil 20 is thereby heated as it passes along the first section 19. At this first section 19 the cross-section of the mandrel 12 is substantially constant, though subject to a slight taper, and is formed by three round rods secured to each other longitudinally, the central rod being of slightly greater diameter than the two outer rods and the grooves between the outer rods being suitably filled to provide an oval cross-section. If preferred, the mandrel, at least in section 19, may comprise a single rod or bar profile ground to a requisite cross-section. At the downstream end of section 19 the outermost bars are profiled to form a restraint 30, on diametrically opposed sides of the central bar so as to resist the passage of the coil along the mandrel 12 and ensure that each successive wrap of strand 16 around the mandrel 12 is pushed by sleeve 21 against the previous wrap on each reciprocation thereof.

Having passed the restraint 30 the coil 20 passes along a second section 31 of the mandrel 12, formed by a rod of reducing cross-section provided as a continuation of the central rod of section 19 so that the cross-section of section 31 is less than that of section 19. During the passage of the coil 20 along this section 31, the coil cools and is eventually pushed off the free end 32 of the mandrel and fed to a receiving can 33.

Before feeding the leading end of coil 20 to a receiving can 33, the length of coil 20 extending along section 31 and off the end 32 is given a desired level of real twist, the restraint 30 and the relatively close fit of the coil 20 around the mandrel 12 in section 19 precluding the twist being transmitted to that length of coil existing in section 19. A suitable level of twist has been found to be about 28 turns per meter. The twist is inserted so as to tend to reduce the section of the coil 20, this being allowed by the smaller cross-section of the mandrel 12 in section 31 and, in so far as the twist extends beyond the restraint, by the reducing cross-section thereof in section 19.

After insertion of the real twist in the coil 20, the leading end thereof is passed around bar 34, making about two wraps therearound, and then fed to the receiving can 33. The bar 34 may be rotated in order to facilitate such forwarding if desired. Alternatively, other feed means (not shown) may be provided.

The effect produced by the abovedescribed apparatus when operated in the manner described is as follows:

The stresses in the strand 16 due to the formation of coil 20 are substantially relieved by the heating step. However, a certain residual stress remains in the coil after cooling, such that if the coil is removed from the mandrel 12 after passage over restraint 30 without the further effect created by the twisting step of the present invention, that residual stress causes a secondary twisting of the coil as described in relation to the prior art methods. However, in the process of the invention the coil 20 is twisted as it passes along section 31 and the heat remaining in the strand material is sufficient to cause substantial stress relieving of the coil in an overtwisted condition. Thus, on removal of the coil 20 from the mandrel 12, the residual stress remaining therein causes the overtwist to be removed and the final coil is in a stress free condition with no secondary twist. Since the twist in the length of coil 20 between restraint 30 and bar 34 is prevented from travelling in either an upstream or downstream direction, the twist initially inserted in the coil remains in that region and passes into successive lengths of coil as they are traversed therethrough.

I claim:

1. A method of producing a coil for use in the manufacture of a link belt comprising winding a strand of polymeric material onto a first section of a mandrel of a given cross-section to form a coil, heating the coil so formed whilst moving said coil longitudinally of said first section, passing said heated coil through a zone in which it is cooled and twisted, in its coiled form, in a twist direction so as to tend to reduce the cross-section of the so-twisted coil, whilst being supported by a second section of said mandrel having a reduced cross-section in comparison with said first section, and removing said coil from said mandrel overend thereof.

2. The method as claimed in claim 1, including the step of axially restraining the coil during passage through at least the first section of the mandrel so that successive turns lie in contact one with another in such section.

3. The method as claimed in claim 1, wherein the coil is held against twist during passage through the first section of the mandrel.

4. The method as claimed in claim 1, including the step of introducing real twist into that axial extent of the coil existing between the downstream end of the first section of the mandrel and a twist arresting means provided in spaced disposition relative to the mandrel, said twist passing into successive lengths of coil during movement thereof between the said first section and the twist arresting means.

5. The method as claimed in claim 4, including the step of moving the coil whilst unsupported by an element engaged therewith between the mandrel and a twist arresting means provided in spaced disposition relative thereto.

6. Apparatus for use in producing a coil comprising a mandrel having a first section of a given cross-section and a second section having a reduced cross-section in comparison with said first section, means for winding a strand of polymeric material onto said mandrel in said first section to form a coil, means for moving said coil so formed longitudinally of said mandrel, means for heating said coil in said first section, and means for maintaining a twist in said coil as it passes along said second section in such manner that said twist maintains said coil in its coiled form and is in such direction as to tend to reduce the cross-section of the so twisted coil, said means for maintaining a twist comprising a first restraint and a second restraint, spaced apart from said first restraint, whereby said twist is maintained between said first and second restraints.

7. Apparatus as claimed in claim 6, wherein the mandrel is stationary, there being a sleeve provided on the mandrel driven so as to reciprocate longitudinally thereof, the said sleeve abutting the trailing wrap of the coil so as to move the coil longitudinally of the mandrel over the first and second sections and off the end of the mandrel.

8. Apparatus as claimed in claim 6, wherein said first restraint is at the downstream end of the first section of the mandrel.

9. Apparatus as claimed in claim 8, wherein the first section of the mandrel is of slightly tapered form and terminates in an enlargement which defines the first restraint.

10. Apparatus as claimed in claim 6, wherein the first section of the mandrel is of oval transverse cross section dimensioned for the formation of a coil of a requisite size and shape thereon and to preclude twist of a coil moving therealong, whilst the second section is of a lesser transverse cross-section to allow twist of the coil existing thereon.

11. Apparatus as claimed in claim 6, wherein said means for maintaining a twist is downstream of the mandrel to receive the coil into engagement therewith.

12. Apparatus as claimed in claim 11, wherein the means for maintaining a twist comprises a bar extending transversely of the intended path of the coil.

13. Apparatus as claimed in claim 6, wherein said first restraint is defined on diametrically opposed sides of the mandrel.

14. Apparatus as claimed in claim 6, wherein said means for winding a strand of polymeric material comprises a flyer arranged coaxially with said mandrel, said flyer having a flyer head which is freely rotatable about the longitudinal axis of said mandrel.

15. Apparatus as claimed in claim 14, further comprising friction means bearing on said flyer head in order to exert a light braking effect thereon to tension said strand of polymeric material.

16. Apparatus as claimed in claim 6, wherein said means for winding a strand of polymeric material comprises a flyer arranged coaxially with said mandrel and having a flyer head which is freely rotatable about the longitudinal axis of said mandrel;

and wherein said means for moving said coil comprises a sleeve mounted coaxially with said mandrel and reciprocating means for reciprocating said sleeve longitudinally with respect to said mandrel, said sleeve abutting said coil and acting to move said coil longitudinally of said mandrel over the first and second sections and off the end of the mandrel, wherein said reciprocating means comprises a cam formed as an integral part of said flyer, a cam follower formed as a part of said sleeve, and a return spring attached to said sleeve and operating to restrain said sleeve from the longitudinal movement induced by said cam, wherein the rotation of said flyer head causes said cam to move said cam follower causing movement of said sleeve away from said flyer, said sleeve being returned to its original position by said return spring.

17. Apparatus for use in producing a closely wound helical coil from polymeric monofilament material, said apparatus comprising:
a stationary mandrel of reducing cross section towards a free end;
a flyer head mounted for rotation coaxially with the mandrel at a position thereon remote from said free end and arranged upon rotation to apply successive turns of polymeric material to the mandrel to form a coil thereon;
a reciprocable sleeve means supported on the flyer head for moving said coil longitudinally of the mandrel;
cam and cam follower means intermediate the sleeve and flyer head to effect reciprocable motion of the sleeve upon relative rotational motion between the cam and cam follower means;
restraint means intermediate the ends of the mandrel defining a first section thereof which extends to the reciprocable sleeve and a second section thereof which extends to said free end of said mandrel;
heating means for heating the coil in the first section; and
means for maintaining a twist in the coil as it passes along said second section in such manner that said twist maintains said coil in its coiled form and is in such direction as to tend to reduce the cross section of the so twisted coil.

* * * * *